United States Patent [19]

Megerle

[11] Patent Number: 5,134,044
[45] Date of Patent: Jul. 28, 1992

[54] GLASS-GRAPHITE BONDING SYSTEM FOR SODIUM-SULPHUR BATTERIES AND BATTERIES MADE THEREFROM

[75] Inventor: Clifford A. Megerle, Thousand Oaks, Calif.

[73] Assignee: Hughes Aircraft Company, Los Angeles, Calif.

[21] Appl. No.: 667,158

[22] Filed: Mar. 11, 1991

[51] Int. Cl.$^5$ .............................................. H01M 2/08
[52] U.S. Cl. .................................. 429/104; 424/185; 29/623.1
[58] Field of Search ................ 429/104, 185; 29/623.1

[56] References Cited

U.S. PATENT DOCUMENTS

| | | | |
|---|---|---|---|
| 3,982,957 | 9/1976 | Jones et al. | 429/185 X |
| 4,245,012 | 1/1981 | Mikkor | 429/185 X |
| 4,287,664 | 9/1981 | Chatterji et al. | 29/623.7 |
| 4,290,192 | 9/1981 | Elkins | 429/104 X |
| 4,999,262 | 3/1991 | Prince | 429/104 |

Primary Examiner—Stephen Kalafut
Attorney, Agent, or Firm—Terje Gudmestad; Jeannette M. Walder; W. K. Denson-Low

[57] ABSTRACT

The present invention is a method for improving the quality of glass to graphite bonds and seals used in high power density batteries, such as sodium-sulfur batteries. The method comprises depositing an interlayer of a two-element compound formed from a group IVa or Va metallic element and a group Vb or VIb nonmetallic element, preferably titanium nitride, between the glass and graphite. The resultant structure is mechanically strong, and forms a leak-free bond when used in such batteries. The invention further comprises batteries including seals formed by the disclosed method.

21 Claims, 2 Drawing Sheets

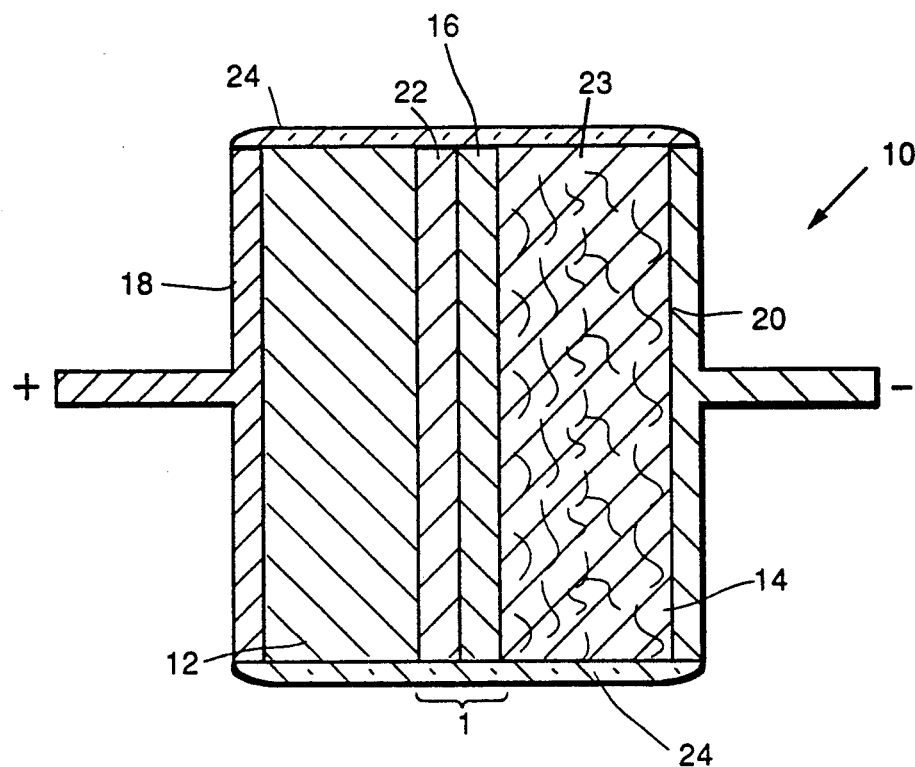
FIG. 1.
FIG. 2.
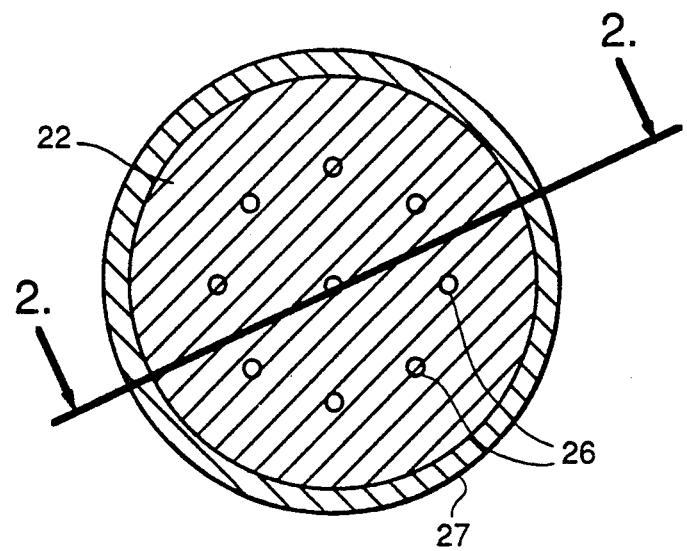

GLASS-GRAPHITE BONDING SYSTEM FOR SODIUM-SULPHUR BATTERIES AND BATTERIES MADE THEREFROM

BACKGROUND OF THE INVENTION

The present invention relates generally to advanced technology thermal battery systems. More particularly, the present invention relates to sodium-sulfur thermal batteries for use in providing a high-density electrical energy source and most particularly it relates to improved methods for forming strong, leak-tight glass-graphite sealing systems used in such batteries.

The sodium-sulfur battery was first introduced in the mid 1960's. Since that time, there has been a great deal of interest in developing cell designs which are suitable for a wide variety of applications. Batteries which have been under development include those for use in automobiles and train locomotives. One such battery is described by J. L. Sudworth in the publication entitled "Sodium/Sulfur Batteries for Rail Traction", in the Record of the Tenth Intersociety Energy Conversion Engineering Conference, 1975, pages 616-620. Cell designs have also been investigated for producing batteries for storage of electricity for delayed use in order to level out the production rate of electricity and for space systems requiring high energy density. The sodium-sulfur battery is used as a secondary, that is, rechargeable battery. Its use as a primary (onetime discharge) battery would be unwarranted because of the cost, complexity and fragility involved in edge-sealing and incorporating a ceramic solid electrolyte into a battery design. In addition, there are other relatively inexpensive primary batteries of higher power density available in the marketplace.

Sodium-sulfur thermal batteries typically include a molten sodium electrode, a molten sulfur electrode and a relatively thin sheet of a solid ceramic sodium ion conducting electrolyte which serves as a separator between the sodium and sulfur electrodes. The electrolytic reaction occurs when sodium ions diffuse through the separator to react with the molten sulfur. Consequently, an important requirement for the separator is that is has a sufficiently high rate of diffusion for sodium ions to allow, during initial operation of the thermal battery, the formation of a sodium polysulfide electrolyte within the separator. To provide satisfactory mechanical strength for the thin ceramic sheet separators used in such a structure, it is typically bonded to an underlying porous graphite support plate.

The sodium-sulfur cell usually operates at a relatively high temperature (300°-400° C.) in order to maintain not only the sulfur and sodium, but also their reaction products, in a molten state. It is believed that the diffusion of the sodium ions into and through the separator occurs when the cell is heated to operating temperatures for the first time to produce a polysulfide gradient. This polysulfide gradient is composed of sodium sulfides having the formula $Na_2S_x$ wherein x is approximately five or less but greater than or equal to one. The composition of this gradient is believed to be:

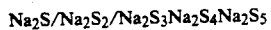

$Na_2S$ is a solid at temperatures below 1000° C. As a result, the solid $Na_2S$ provides a solid barrier which prevents migration of liquid sulfur or sodium through the entire separator. At the same time, the remainder of the polysulfide gradient provides levels of ionic conductivity which are not possible with the previous solid ceramic materials. The use of a diffusion allowing separator in combination with a polysulfide gradient provides suitable liquid electrode separation, while also providing high rates of ionic conduction and resulting high electrical power output.

In use, it is found that a structure as described herein above reduces the electrical resistance of the sodium-sulfur cell, leading to low $I^2R$ power loses and, therefore, high delivered power densities from the battery's cells. In this structure, the porous graphite backing, by supporting the beta" alumina separator, allows the use of a separator sheet that would otherwise be too thin to survive the thermal and mechanical stress generated during operation of the cell. At the same time, the porous graphite permits sodium to diffuse therethrough and contact the inner side surface of the separator so that the cell reaction can occur. The solid electrolyte is a critical part of the cell configuration because it must also provide separation of the liquid sodium from the liquid sulfur in order to prevent catastrophic cell failure. Solid electrolytes which have been used in sodium-sulfur batteries include beta"-(double prime) alumina and other sodium ion conducting ceramics or glasses, with beta"-alumina being the most popular solid electrolyte. Such batteries are effective for many applications, but when efforts are made to produce sodium-sulfur batteries having still higher power densities, it is found that the bond line between the beta" alumina separator and the porous graphite support tends to fail quickly in service because these materials suffer from having relatively low conductivity and, further, have coefficients of thermal expansion which are not well matched to other materials used in making the cell.

In an effort to overcome this problem, various materials to strengthen the bond line between the beta" alumina separator and graphite support and to seal the resultant battery structure have been investigated. Such materials have to be able to bond effectively to both the beta" alumina and graphite without significantly affecting the basic electrical reaction within the cell. One such material used for this purpose are borate glasses which bond to both the beta" alumina separator and to the graphite, without compromising the electrical integrity of the battery. In my copending U.S. Patent Application, Ser. No. 667,157, filed Mar. 11, 1991 and entitled "Glass Sealing Materials for Sodium-Sulfur Batteries and Batteries Made Therewith", the teachings of which are incorporated herein in their entirety, I have described one such borate sealing glass; said glass comprising a mixture of $Na_2O$, $Cs_2O$ and $B_2O_3$. However, in practice, it is found that in very high density applications, even this glass does not adhere strongly enough to the graphite support structure to make the glass to graphite bond sufficiently mechanically strong and leak-free for such service.

SUMMARY OF THE INVENTION

This invention is an interlayer material comprising an anionic metallic element selected from groups IVa and Va of the periodic table and a cationic nonmetallic element selected from group VB and VIB of the periodic table. A method is provided for using this interlayer material to facilitate the bonding of a sealing glass to both a very thin sheet of beta" alumina and to a supporting substrate made from porous graphite and batteries made by this method.

The method of joining these materials comprises the steps of: (a) providing a porous graphite substrate for use in said sodium sulfur battery structure; (b) depositing an interlayer of a two element compound onto an upper surface of said substrate, said compound being formed by the combination of an anionic metallic element selected from the group consisting of groups IVa and Va and a cationic nonmetallic element selected from the group consisting of groups Vb and VIb of the periodic table onto an outer surface of said graphite substrate; (c) depositing a layer of a sealing glass paste onto said deposited interlayer; (d) placing a sheet of a separator material as used in said battery onto said glass paste layer; and (e) heating the assembled structure so as to fuse the glass paste to both the deposited interlayer and to the sheet of separator material. Preferred for this purpose are group IVa metal nitrides and, most preferably, the deposited interlayer compound is titaniumnitride (TiN).

In use, the deposited interlayer material acts as a bonding agent between the graphite substrate and the glass sealing paste to produce glass to graphite bonds which are much stronger than those produced when the interlayer compound of the present invention is not used. Further, the process of the present invention results in the formation of a mechanically strong, leak-tight bond and seal for the solid ion-conducting electrolyte/anode-cathode separator, with low electrical resistance, for an advanced sodium-sulfur battery.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a schematic representation of an exemplary sodium-sulfur cell as used in the present invention;

FIG. 2 is a schematic plan view of a porous graphic support showing the location of the glass pedestals and edge seal as used in the separator/support assembly in a battery as exemplified in FIG. 1 along the section marked 1.

DETAILED DESCRIPTION

Figure 3:
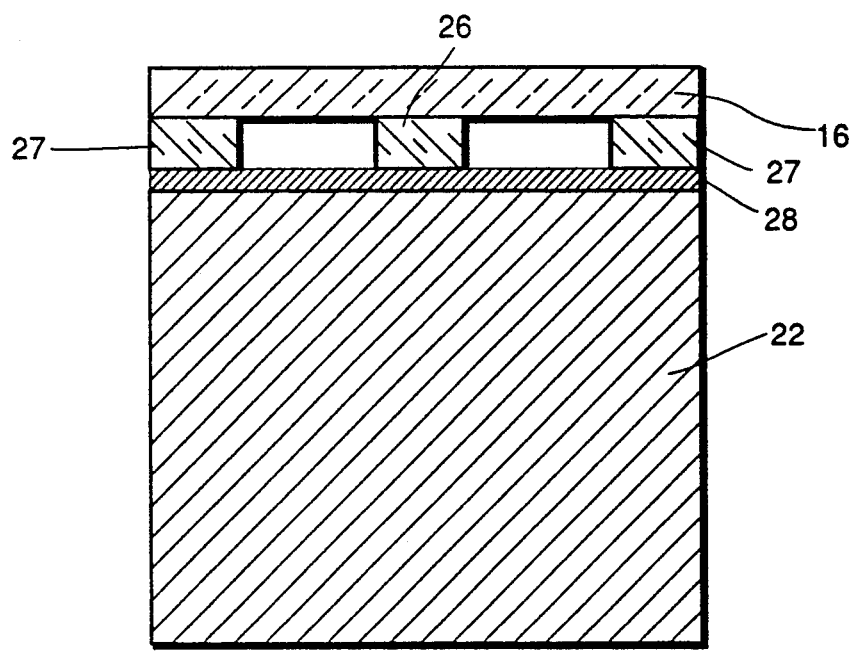
FIG. 3 is a schematic side view of the graphite/separator assembly as shown in FIG. 2 along line 2—2 of FIG. 2.

The present invention comprises a method for providing a mechanically strong, leak-tight bonded layer of a sealing glass for use in an in bonding a graphite support to a separator in an advanced high-power sodium-sulfur battery. An exemplary sodium-sulfur thermal cell is shown diagrammatically in FIG. 1 at 10. The cell 10 includes a metal wick anode 12 which is impregnated with metallic sodium and a carbon graphite felt cathode 14 which is impregnated with sulfur. The anode 12 and the cathode 14 are separated by an oxide separator 16. Current collectors 18 and 20 are provided at the anode and cathode, respectively, for allowing removal of electrical energy from the cell 10. Bonded to the sodium side of the separator 16 is a porous graphite support plate 22. This serves to reinforce the separator with the porosity thereof being of sufficient size and quantity so as not to significantly impede the passage of liquid or gaseous sodium making contact with the electrolyte containing ceramic separator 16. The entire assembly is then sealed with a glass seal 24. Note that the details of the glass seal along the border 23 between separator 16 and graphite plate 22 are not shown in this figure.

The material used to form the metallic wick 12 may be any known material that preferentially wets sodium metal. These materials include nickel, steel, or any other suitable metallic material. The wick 12 is preferably made from nickel felt which is commercially available. The pore size and surface area of the nickel felt may be varied provided that sufficient wetting and impregnation with sodium metal is possible in order to form a suitable liquid electrode. Nickel felt suitable for this application is marketed under the trade name Fibrex by the National Standard Company, Niles, Mich.

The wick anode 12 or felt cathode 14 utilized to support the liquid sulfur may be any conductive fibers, powders or felt materials which are preferentially wet by molten sulfur. Commercially available graphite felts are the materials of choice in state-of-the-art sodium-sulfur battery technology. Any of the felts used in these batteries is adequate for the purposes of this invention. An adequate felt is SGF available from Stackpole Corp., St. Marys, Pa.

The material used for the separator 16 should have sufficient porosity to allow preliminary migration of fluid (liquid or gaseous) sodium metal and fluid (liquid or gaseous) sulfur therethrough during initial operation of the battery to form an initial polysulfide electrolyte gradient. The term "preliminary migration" is used to mean the migration which occurs upon initial operation of the cell, in order to establish the polysulfide electrolyte gradient. Once this gradient is established, there is no longer a free flow of the fluids; however, the gradient established is sufficient to promote diffusion through the separator 16. The separator 16 can be made from a ceramic material such as silica fibers sintered into a porous mat such as is available from Lockheed Corp., Sunnyvale, Calif. as FRCI-12 or HTP-12. Other suitable porous ceramic materials include zirconia or alumina felt and paper available from Zircar Products, Inc., Florida, N.Y., as zircar alumina felt and paper APA-1, APA-2 and APA-3. Especially preferable is beta" alumina available from Ceramatec (in the United States), Brown-Boveri (Switzerland) and NKG (Japan).

As shown in FIGS. 1, 2 and 3, the assembly of the separator 16 with the graphite support plate 22 is typically accomplished by the use of a sealing glass 24 which, in the preferred embodiment performs two separate functions and is in two different forms. The first of these comprises a plurality of short supporting seal glass pedestals 26 which, in a subsequent fusion process, are melted to form a mechanically strong bond between the ceramic top separator 16 and the underlying graphite support plate 22 below. low. The second form is a continuous band 27 of glass around the circumference of the battery 10. Sealing and bonding occur when the glass is heated beyond its fusion temperature, as will be described herein below.

In the structural embodiment shown, the porous graphite support plate 22 supports the separator plate 16 while allowing sodium ions to diffuse through it to come in contact with the inner surface thereof. In providing a finished structure having the requisite electrical, thermal and mechanical properties, the glass used to bond the separator 16 to the graphite support plate 22 must have a thermal expansion coefficient, viscosity, and overall chemical inertness sufficient to withstand the service stresses encountered in this application. Particularly in the structure illustrated in FIGS. 1, 2 and 3, it must substantially match the thermal expansion coefficient of beta double primed alumina, since the beta" alumina is the most fragile part of the system and, therefore, the part most subject to fracture and failure. One glass found to particularly suitable and therefor preferred for this application has the general composition $Na_2O \cdot Cs_2O \cdot B_2O_3$ and is described in my copending U.S. patent application Ser. No. 667,157, filed Mar. 11, 1991 and entitled "Glass Sealing Batteries Materials for Sodium-Sulfur Batteries", the teachings of which are incorporated herein in their entirety. To overcome the problem of glass to graphite bond failure in high power density operation, the method of the present invention comprises placing a thin interlayer 28 comprising a two element compound, said compound being formed by the combination of an anionic metallic element selected from groups IVa (Ti, Zr and Hf) and Va (V, Nb and Ta) of the periodic table, with a cationic nonmetallic element selected from groups Vb (N, P, As, Sb and Bi) and VIb (O, S, Se, Te and Po) of the periodic table. This interlayer 28 acts as a bonding agent between the top surface of the graphite support plate 22 and the glass pedestals 26 and sealing band 27. Preferably, it is a compound formed from a group IVa element and a group Va element, more preferably it is a group IVa nitride, and most preferably it is titanium nitride (TiN). By so doing, it has been found that the thermal and mechanical strengths of the resultant glass to graphite bond are increased to the point where the graphite will fail before the bond line does when the battery is used in a high power density operation. In one embodiment of the present invention, the TiN interlayer 28 is preferably deposited using standard metallo-organic chemical vapor deposition (MOCVD) techniques such techniques being well known to those of skill in the art. It should be appreciated that other methods such as sputtering can also be used. The thickness of the deposited interlayer material should be with the range of about 1 to about 50 microns, preferably from about 2 to about 25 microns.

The completed structure is formed by preparing a paste from by grinding a sealing glass frit to have a bimodal size distribution comprised of roughly an equal proportion of "large" particles, i.e., 20 to 40 microns in diameter and "small" particles, i.e. submicron to 10 microns in diameter, with a modal peak at about 1 micron in diameter. As noted above, a preferred glass for this purpose has the general composition of $Na_2O \cdot Cs_2O \cdot B_2O_3$. This glass composition may be prepared by mixing powders of sodium metaborate, boric acid, sodium carbonate, and cesium carbonate in the correct ratios to obtain the above composition, melting the mixture in a glass-making muffle furnace at high temperature using a platinum or zirconium crucible. Homogenization is achieved by occasional stirring or by bubbling $O_2$ through the melt using a platinum tube. The glass is then poured out onto graphite to cool, after which the glass is ground into a powder of suitable particle size distribution. This is made into the above described paste using an organic liquid as a vehicle, and a polymeric or high molecular weight organic material such as alpha methyl polystyrene, as a binder.

Suitable vehicle materials include those that do not absorb appreciable water from the atmosphere, and those that burn off cleanly during the process of fusing the glass powder to make the seal. A number of these materials such as cumene, toluene and benzene are well known to those skilled in screen printing of glass powders or glass-containing metallizations. Since all borate glasses are highly hygroscopic, the glass should be prepared, ground, and subsequently handled under controlled and reduced humidity conditions. But, because beta"-$Al_2O_3$ is also hygroscopic, this condition should pose no special requirements on the overall battery assembly process.

The final step in forming the completed structure involved laying down the glass paste in a prescribed pattern to form an edge seal 27 and the pedestals 26. Two methods of glass deposition are available. In the first of these, the paste is hand deposited using a syringe and a hypodermic needle. Preferred however is the method of screen printing the sealing glass paste onto the TiN-coated graphite surface in a pattern that provides the material for both the edge seal 27 and the pedestals 26 within the assembly as needed to promote overall structural strength. In this method, it is, of course, necessary to plug the screen holes not needed to form the desired pattern. Techniques for doing this are well known in the art. Because of the excessively hygroscopic nature of the sealing glasses used in the present invention, it is most important that all of the steps from the initial formation of the glass frit to the final deposition of the glass paste be carried out in a moisture free environment, that is either in a vacuum or under a moisture free gas such as dried air, nitrogen or argon.

In preparing a mechanically strong, leak-tight bonded structure 10, the beta" alumina sheet comprising the oxide separator 16 is merely placed upon the screen printed sealing glass, with the resultant assembly being made by fusing the sealing glass. Several methods are available for doing this. In the first of these a belt furnace and a reducing atmosphere is used with the cycle being set to rapidly heat the structure to just above the fusion point of the glass, i.e., about 450° C. to about 600° C. followed by a relatively long cool down time. Preferably such a furnace would be used for the production of a relatively large number of batteries of the same or similar design. For smaller quantities, conventional vacuum furnaces of muffle furnaces equipped with a reducing atmosphere can also be used. Whichever method of fusion is used, the structure should be cooled from fusing temperature to room temperature gradually, preferably at a rate of around 1° C./min. for the temperature range between the softening point and the strain point of the glass. At lower temperatures, it may be cooled at faster rates.

Glass-to-graphite bonds as produced by the methods described above have been shown to be considerably stronger than either the graphite or the glass used to form the composite structure. Although the thickness of the beta" alumina separator 16 may be varied according to intended use, it is preferred that it be between about 0.01 cm to about 0.3 cm. Preferably, it will have a thickness of about 0.01 cm to about 0.06 cm.

Operation of the sodium-sulfur thermal cell shown in FIG. 1 is carried out in accordance with conventional operating procedures for sodium-sulfur batteries. Typically, this involves heating of the cell to a temperature at which the sodium metal and sulfur are both liquids. This temperature is typically between 300° C. to 400° C. depending upon the pressure within the cell.

In general, generation of electrical current will take slightly longer when a cell made in accordance with the present invention is heated for the first time. This is due to the necessity for the sodium ions to diffuse into the beta" alumina separator 16 for reaction and formation of the polysulfide electrolyte gradient. Alternatively, the beta" alumina separator 16 may be pre-impregnated with a polysulfide (preferably $Na_2Sa_3$). Such pre-impregnation of the beta" alumina separator 16 provides immediate turn-on of the cell once it reaches operating temperature.

In a second embodiment of the present invention, an alternative electrolyte comprising sodium tetrachloroaluminate is impregnated into the beta" alumina separator 16. Impregnation of the beta" alumina separator 16 with sodium tetrachloroaluminate provides a highly conductive electrolyte with good transport properties. Sodium tetrachloroaluminate is also know to wet oxides and to solubilize not only the sodium polysulfides, but also sulfur to a lesser degree. The amount of sodium tetrachloroaluminate which should be impregnated into the separator will vary depending upon the maximum current density desired.

It should be noted that changes in the volume of materials in the compartments defined by the sodium and sulfur electrodes will occur on discharge. This is not normally a problem in conventional thermal batteries which operate for only brief periods. However, in many applications the electrochemical cell will have an active operating time on the order of one hour or more. Material transport within the cell will be from the sodium anode 12 to polysulfides in the cathode 14. The result will be the filling of the graphite felt in the sulfur cathode 14. The net cell reaction can be considered to be:

$$2Na + 3S \rightarrow Na_2S_3$$

$Na_2S_3$ wets graphite felt, but not in preference to the liquid sulfur. Accordingly no extra separator material nor separator structures need be used to contain discharge reaction products. There will be a net increase in the material on the cathode side 14 of separator 16 and the sodium electrode side 12 of the cell will be depleted. However, the total volume of material in the compartment on the sulfur cathode side of the beta" alumina separator 16 will increase only slightly. Typically, allowance is made for this slight volume increase by leaving some empty cathode volume when the cell is initially filled with sulfur.

Thus there has been described a new and improved glass-graphite bonding system for sodium-sulphur batteries and a method for making same. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method for improving the bonding between a sealing glass and a graphite support structure in a sodium-sulfur battery, said method comprising the steps of:
   providing a porous graphite structure for use in said sodium sulfur battery structure;
   depositing an interlayer of a two element compound onto an upper surface of said substrate, said compound being formed by the combination of an anionic metallic element selected from the group consisting of groups IVa and Va and a cationic nonmetallic element selected from the group consisting of groups Vb and VIb of the periodic table;
   depositing a layer of a sealing glass paste onto said deposited interlayer;
   placing a sheet of a separator material onto said sealing glass layer; and
   heating the assembled structure so as to fuse the glass paste to both the deposited interlayer and to the sheet of separator material.

2. The method of claim 1 wherein the metallic element in said two element interlayer compound is selected group IVa of the periodic table.

3. The method of claim 1 wherein the nonmetallic element in said two element interlayer compound is selected from group Vb of the periodic table.

4. The method of claim 2 wherein the nonmetallic element in said two element interlayer compound is nitrogen.

5. The method of claim 1 wherein the two element interlayer compound is titanium nitride.

6. The method of claim 1 wherein the interlayer material is deposited to a thickness of between about 1 to about 50 microns.

7. The method of claim 5 wherein the interlayer material is deposited to a thickness of between about 2 and about 25 microns.

8. The method of claim 1 wherein said interlayer is deposited by a process selected from the group consisting of sputtering and metallo-organic chemical vapor deposition.

9. The method of claim 5 wherein said interlayer is deposited by metallo-organic chemical vapor deposition.

10. The method of claim 1 wherein said sealing glass paste is deposited by screen printing.

11. The method of claim 10 wherein the glass paste is formed from a ground glass frit having a bimodal size distribution, with the first mode having a particle size ranging from submicron to about 10 microns and a modal peak of about 1 micron, and with the second mode comprising particles having a size in the range of about 20 to about 40 microns.

12. The method of claim 1 wherein said separator is selected from the group consisting of sintered alumina fibers, alumina felt and zirconia felt.

13. The method of claim 5 wherein the separator is beta" alumina.

14. The method of claim 1 wherein the separator has a thickness of between about 0.01 to about 0.3 cm.

15. The method of claim 13 wherein the separator has a thickness of between about 0.01 to about 0.06 cm.

16. The method of claim 1 wherein the fusion temperature is between about 450° C. and about 600° C.

17. A battery as made by the method of claim 1.

18. A battery as made by the method of claim 5.

19. A battery as made by the method of claim 15.

20. A method for improving the bonding between a sealing glass and a graphite support structure in a sodium-sulfur battery, said method comprising the steps of:
   providing a porous graphite substrate for use in said sodium sulfur battery structure;
   depositing an interlayer of titanium nitride to a thickness of between about 2 and about 25 microns;
   screen printing a layer of a sealing glass paste onto said deposited interlayer;
   placing a separator sheet of beta" alumina having a thickness between about 0.01 and about 0.03 cm onto said printed glass layer; and
   heating the assembled structure to a temperature of between about 450° C. and about 600° C. so as to fuse the glass paste to both the deposited interlayer and to the sheet of separator material.

21. A battery as made by the method of claim 20.

* * * * *